United States Patent [19]
Cornelius et al.

[11] Patent Number: 4,848,494
[45] Date of Patent: Jul. 18, 1989

[54] PLATFORM BALANCE

[75] Inventors: Klaus Cornelius, Lenglern; Rainer Exner, Wollbrandshausen, both of Fed. Rep. of Germany

[73] Assignee: Sartorius GmbH, Fed. Rep. of Germany

[21] Appl. No.: 281,225

[22] Filed: Dec. 8, 1988

[30] Foreign Application Priority Data

Dec. 22, 1987 [DE] Fed. Rep. of Germany ....... 3743526

[51] Int. Cl.[4] .......................... G01G 21/08; G01G 3/08
[52] U.S. Cl. ................................. 177/259; 177/229; 177/DIG. 9
[58] Field of Search ......................... 177/188, 256-259, 177/229, DIG. 9

[56] References Cited

U.S. PATENT DOCUMENTS

| | | | |
|---|---|---|---|
| 4,411,326 | 10/1983 | Siegel | 177/229 X |
| 4,461,364 | 7/1984 | Strickler | 177/DIG. 9 |
| 4,674,582 | 6/1987 | Kunz | 177/256 |
| 4,726,435 | 2/1988 | Kitagawa et al. | 177/229 X |
| 4,799,561 | 1/1989 | Komoto | 177/229 |

FOREIGN PATENT DOCUMENTS 2156788  5/1973  Fed. Rep. of Germany ...... 177/257

*Primary Examiner*—George H. Miller, Jr.
*Attorney, Agent, or Firm*—Eric P. Schellin

[57] ABSTRACT

Disclosed is a platform balance with a weighing scale, with at least two levers (2) which are mounted via spring joints (3) on support points (5) fixed to the housing, with a force summation part (6) which is guided in parallel by an upper and lower guide rod (7) and with coupling elements (4) which connect the longer lever arm of the levers (2) to the force summation part (6) that the shorter lever arm of each lever (2) is connected by a coupling element (13) to a load receiver (14), that each load receiver (14) is guided in parallel by an upper and a lower guide rod (15) and that the weighing scale (18) is supported on the load receivers (14). As a result thereof, deformations of the weighing scale or of its carrier construction can no longer affect the levers (2) and their lever arm ratio. In an advantageous embodiment the parallel guide of a load receiver (14) and the support points (5) of the associated lever (2) form a component which can be derived e.g. from the parallel guide system of a precision balance with scale on top.

8 Claims, 3 Drawing Sheets

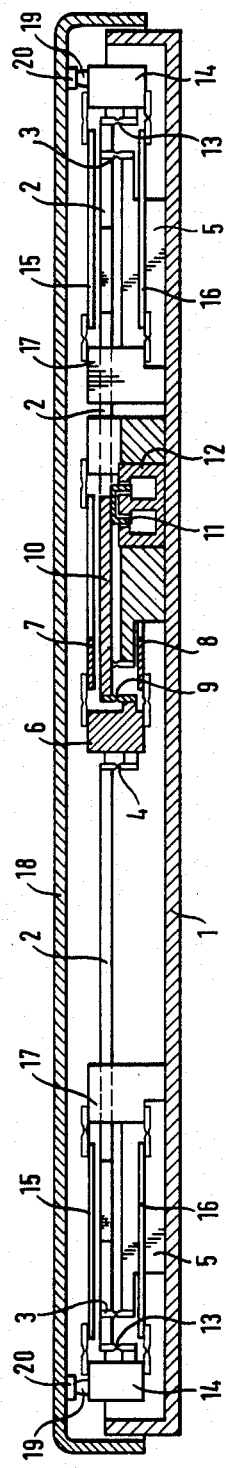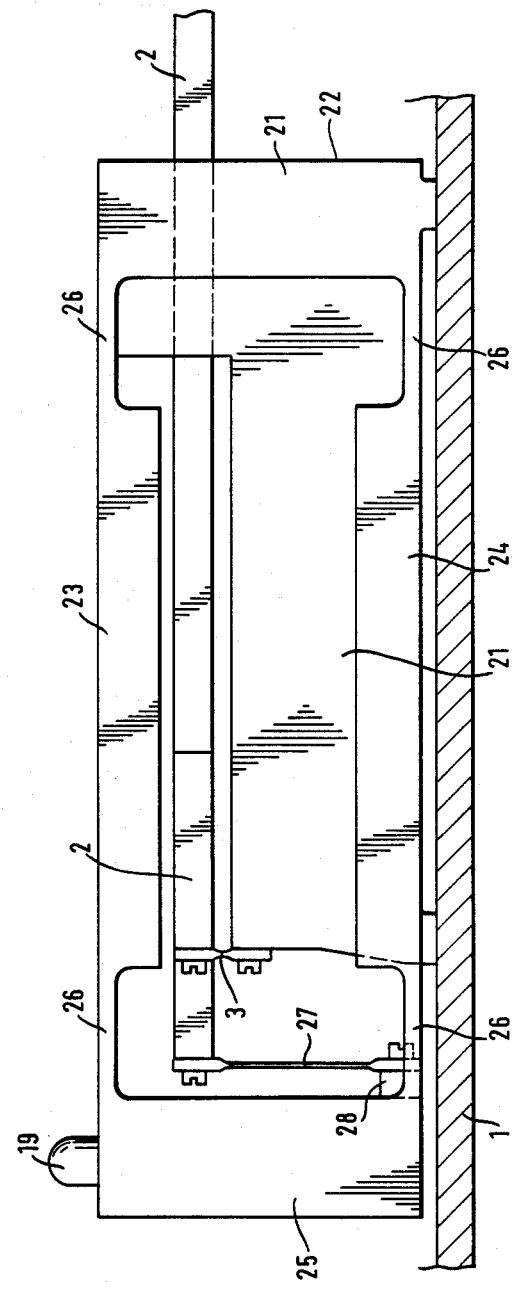
Fig. 2
Fig. 3

PLATFORM BALANCE

This invention relates to a platform balance with a weighing scale, with at least two levers which are mounted via spring joints on support points fixed to the housing, with a force totaling part which is guided in parallel by an upper and lower guide rod and with coupling elements which connect the longer lever arm of the levers to the force totaling part.

Platform balances of this type are known e.g. from EP-01 71 539 A2. In the known designs, the balance scale or a lower scale is supported via resilient coupling elements on the ends of the shorter lever arms of the levers, which are connected by a bridge frame.

A disadvantage of these known prior designs is the fact that even slight deformations of the bridge frame will lead directly to deformations of the coupling elements and therewith partially also to changes of the translation ratio of the levers. Therefore, the bridge frame must be designed to be very stable and torsion-resistant, i.e. twist resistant.

The invention therefore has the object of improving a platform balance of the initially mentioned type in such a manner that it is less sensitive to deformations of the weighing scale or of the lower scale and that a torsion-sensitive bridge frame can be eliminated.

The invention achieves this objective in that the shorter lever arm of each lever is connected by a coupling element to a load receiver, that each load receiver is guided in parallel by an upper and a lower guide rod and that the weighing scale is supported on the load receivers.

The intercalation of a parallel-guided load receiver between weighing scale and levers results in a decoupling of the inner lever arrangement from the weighing scale. As a result, deformations of the weighing scale can no longer extend to the lever arrangement. It is also possible as a result to achieve a considerably simpler design of the weighing scale and/or of a lower scale.

BRIEF DESCRIPTION OF THE DRAWINGS

The invention is described in the following with reference made to the schematic figures.

FIG. 2 shows a section along dotted line I—I in FIG. 1.

FIG. 3 shows a component of the platform balance in another embodiment in a lateral view.

DETAILED DESCRIPTION OF THE INVENTION

Figure 1:
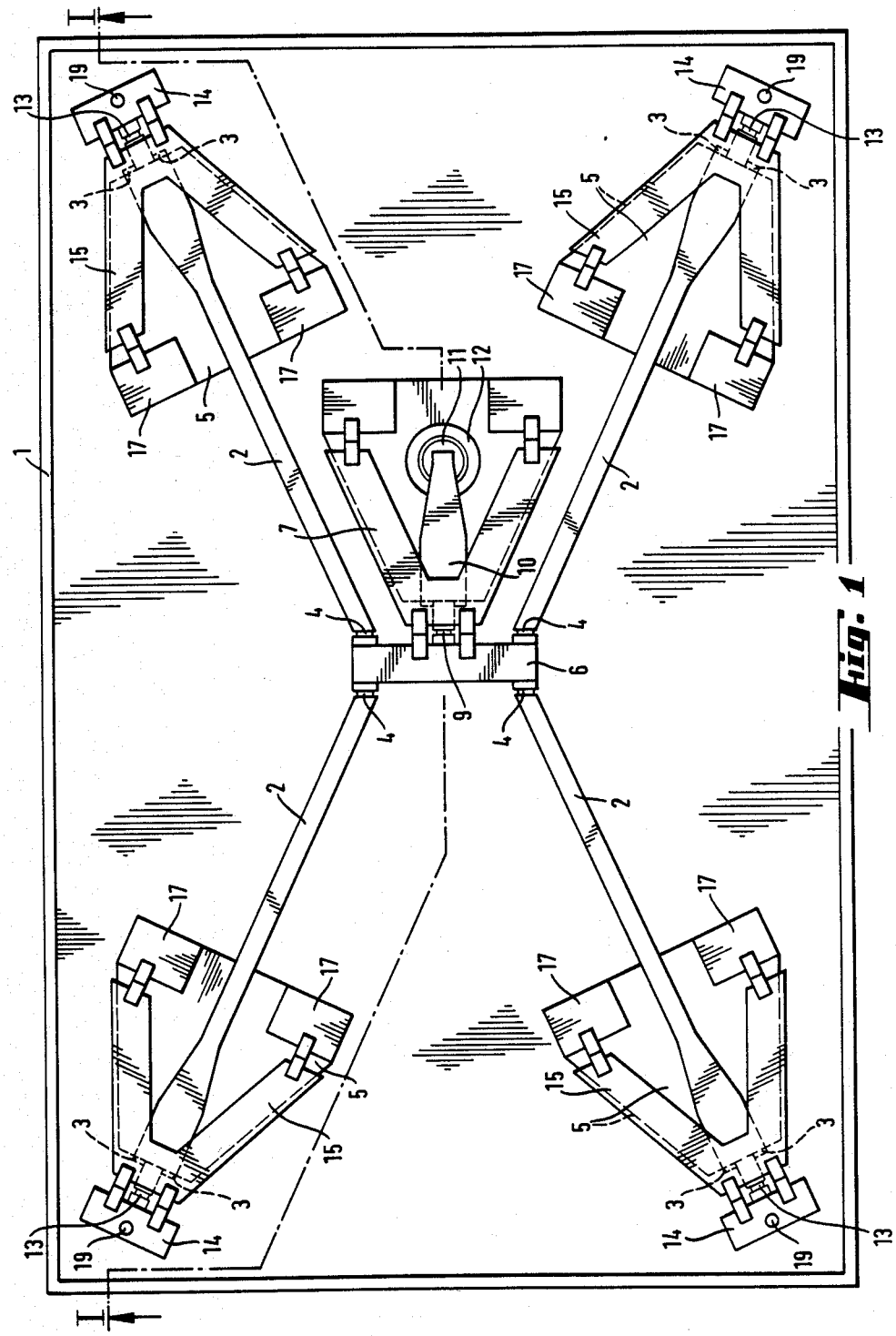
FIG. 1 shows a top view of the platform balance.

FIGS. 1, 2 show the platform balance in a first embodiment given by way of example. FIG. 1 is a top view with the weighing scale removed and FIG. 2 is a section of dotted line I—I. A housing 1 is visible which consists of a base plate and peripheral frame. Furthermore, four levers 2 are present which are mounted via spring joints 3 to support points 5 fixed to the housing. Each longer lever arm of these levers 2 is connected by a coupling element 4 to a force summation part 6. This force summation part 6 is guided in parallel by an upper guide rod 7 and a lower guide rod 8 recognizable only in FIG. 2. The forces transmitted onto force summation part 6 are transmitted via another coupling element 9 onto the shorter lever arm of translation lever 10 whose longer lever arm carries coil 11 located in the air gap of permanent magnet system 12. The current through coil 11 is regulated thereby in a known manner by an electronic circuit (not shown) in such a manner that the force generated exactly balances the force transmitted from force summation part 6. The thrust force generated by the force compensation system via coil 11 onto translation lever 10 in accordance with the arrangement of FIGS. 1, 2 can also be generated as a tractive force by rotating the force compensation system through 180°, that is by rotating coil 11 downward.

The shorter lever arm of each lever 2 is connected via a coupling element 13 to a load receiver 14 which is guided in parallel by an upper guide rod and a lower guide rod recognizable only in FIG. 2. Supports points 17 of guide rods 15, 16, which points are fixed to the housing, form one piece together with support point 5 for the mounting of lever 2. In order to carry weighing scale 18, shown only in FIG. 2, each load receiver 14 comprises a support point 19 which assures in conjunction with a corresponding counterpart 20 on weighing scale 18 a stable support of weighing scale 18 on the four load receivers 14.

Horizontal forces which act on weighing scale 18 are absorbed by the parallel guide system of the guide rods of load receivers 14 and not transmitted further to levers 2.

In like manner a change of the force attack point on support points 19 does not result in any change of the force transmitted on coupling element 13 since the parallel guide system of the guide rods is, as is known, independent of the location of the introduction of force. Therefore, flexions of weighing balance 18 no longer influence the result of weighing.

It is assumed for the sake of simplicity in FIGS. 1, 2 that weighing scale 18 is supported via support points 19, 20 directly on load receivers 14. In like manner, the customary shock absorbers, overload protection devices and the ribbings for increasing the rigidity have been omitted in FIGS. 1, 2 for the sake of clarity.

The four levers 2 run approximately along the diagonals of the weighing scale in the embodiment shown. A design is of course also possible in which the force summation part runs over the entire width of the platform balance and the four levers run parallel to the longer side of the platform balance.

The component consisting of parts 5/17, 14, 15 and 16, which is present four times in the platform balance, can be e.g. a customary guide rod parallel guide system of a precision balance with a scale on top, perhaps with small modifications. The same applies to the parallel guide for force summation part 6, so that the platform balance of the invention consists in essence of four identical components and a fifth, likewise identical or similar component. This makes a very economical manufacture possible in spite of the actually greater number of components compared to conventional bridge balances.

Another embodiment of the parallel guide for the load receiver and of the fixed point for the lever mounting is shown in a lateral view in FIG. 3. This embodiment is based on a parallel guide like that described in DE-OS No. 34 22 042 and consists essentially of a single cast or milled part. This part comprises an area 21 fixed to the housing with a raised-up back wall 22. Upper guide rod 23 and lower guide rod 24 are cast on back wall 22 and merge on the other side into load receiver 25. The guide rods comprise thin areas 26 on their ends which function as articulation points. Lever 2 is designed as in the embodiment of FIGS. 1, 2 and is connected via spring joints 3 to area 21 fixed to the housing. The transfer of force from load receiver 25 to lever 2 takes place via coupling element 27 fastened to lever 2 and to projection 28 of load receiver 25. Viewed from the top, guide rods 23 are approximately trapezoidal and thus like the guide rods in FIG. 1.

Four of these components shown in FIG. 3 are located just as in FIG. 1 in the corners of the platform balance and make available the four support points 19 for the weighing scale. The parallel guide for the force summation part can likewise be designed in the same manner, as FIG. 3 depicts. Additional milled slots can be provided e.g. in the parallel guide for the force summation part on thin areas 26 as the sole difference in order to reduce the rigidity of this parallel guide since this parallel guide only has to process slighter forces due to the lever translation.

Figure 4:
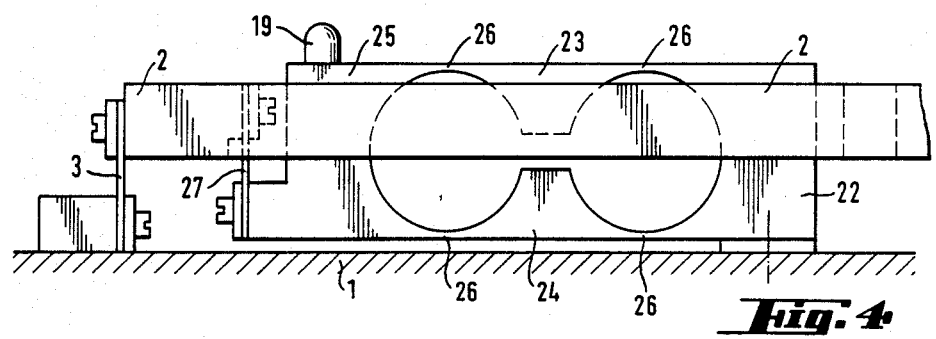
FIG. 4 shows a lateral view of another embodiment of the parallel guide with a one-armed lever.
Figure 5:
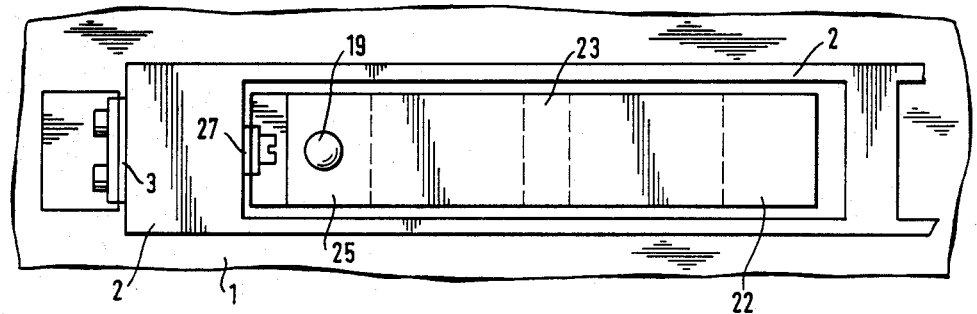
FIG. 5 shows a top view according to FIG. 4.

FIGS. 4, 5 show a simplified parallel guide unit 23 to 26 with associated one-armed lever 2 which is located diagonally corresponding to the arrangement in FIG. 1 and can be combined with a force summation part 6 and force compensation system 11, 12 according to FIG. 1.

Parts corresponding to those in FIG. 3 have the same reference numerals in FIGS. 4 to 7.

According to FIGS. 4, 5, parallel guide unit 23 to 26 consists of a one-piece milled or cast part belonging to the state of the art. The force introduced at 19 is introduced via the coupling at 3, 27 into one-armed lever 2 and from it into force summation part 6.

Figure 6:
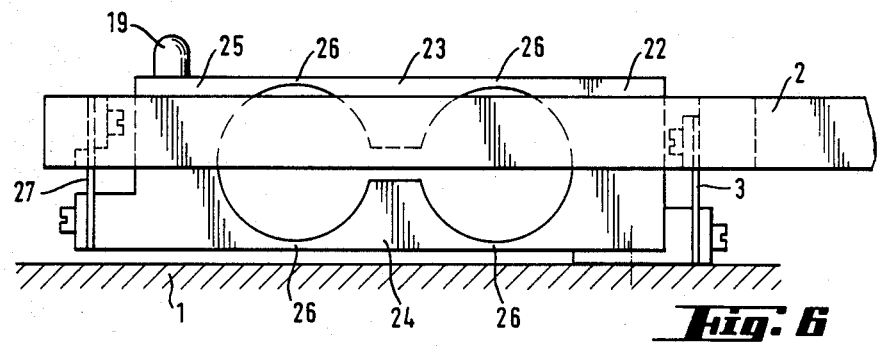
FIG. 6 shows a lateral view of another embodiment of the parallel guide with a two-armed lever.
Figure 7:
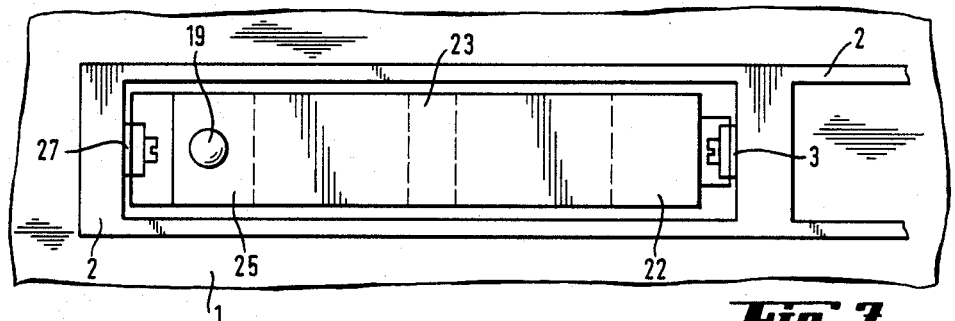
FIG. 7 shows a top view according to FIG. 6.

Parallel guide unit 23 to 26 in FIGS. 6, 7 is designed correspondingly. As a deviation, two-armed lever 2 engages parallel guide unit 23 to 26 via coupling 3, 27 which unit is fixed to fixed housing points 1. The embodiment of FIGS. 6, 7 forms a unit which can be pre-mounted with lever 2.

The load receivers in the parallel guide units are short-travel load receivers, that is, they move only a few micrometers vertically out of their zero positions since the electromagnetic compensation of force holds the load receivers in this zero position. The vertical motion occurs practically only at an overload between two fixed end stops set at an interval of a few micrometers.

We claim:

1. A platform balance with a weighing scale, with at least two levers which are mounted via spring joints on support points fixed to the housing, with a force summation part which is guided in parallel by an upper and a lower guide rod and with coupling elements which connect the longer lever arm of the levers to the force summation part, comprising a shorter lever arm of each lever (2) which is connected by a coupling element (13, 27) to a load receiver (14, 25), each load receiver (14, 25) is guided in parallel by an upper and a lower guide rod (15/16, 23/24) and the weighing scale (18) is supported on the load receivers (14, 25).

2. The platform balance according to claim 1, wherein the parallel guide of a load receiver (14, 25) and the support points (5, 21) fixed to the housing for mounting the associated lever (2) form one component.

3. The platform balance according to claim 2, wherein the component forming the parallel guide of a load receiver (25) and the support points (21) fixed to the housing for mounting the associated lever (2) is as a casting.

4. The platform balance according to claim 2, wherein the guide rods (7/8) for the parallel guide of the force summation part (6) exhibit the same form and size as the guide rods (15/16, 23/24) for the parallel guide of the load receivers (14, 25).

5. The platform balance according to claim 4, wherein the parallel guide of the force summation part (6) and the parallel guide of the load receiver (14, 25) are substantially identically in configuration.

6. The platform balance according to claim 5, wherein the two guide rods (15/16, 23/24) for the parallel guide of a load receiver (14, 25) are designed substantially trapezoidally, the associated lever (2) is located approximately in the bisecting line of this trapezoid and that the shorter lever arm of the lever (2) is located inside this trapezoid.

7. The platform balance according to claim 6, wherein four levers (2) are present which run approximately along the diagonals of the weighing scale (18).

8. The platform balance according to claim 7, wherein the narrower side of the trapezoid faces the associated load receiver (19) and the corner of a rectangular load scale (18) and the periphery of the housing (1).

* * * * *